United States Patent
Gu

(10) Patent No.: US 6,561,534 B2
(45) Date of Patent: May 13, 2003

(54) TWIST VEHICLE WITH REAR OPERATION SYSTEM

(75) Inventor: Hong-Jiun Gu, 6 Fl. No. 67, Lane 27, Alley 372, Sec. 5, Chung Hsu East Road, Taipei (TW)

(73) Assignees: Hong-Jiun Gu, Taipei (TW); Jar-Chen Wang, Cerritos, CA (US)

( * ) Notice: Subject to any disclaimer, the term of this patent is extended or adjusted under 35 U.S.C. 154(b) by 0 days.

(21) Appl. No.: 09/967,801

(22) Filed: Oct. 1, 2001

(65) Prior Publication Data

US 2002/0074180 A1 Jun. 20, 2002

(30) Foreign Application Priority Data

Aug. 11, 2000 (TW) ...................................... 89219399 U

(51) Int. Cl.[7] ................................................ B62M 1/14
(52) U.S. Cl. ................................................... 280/242.1
(58) Field of Search .............................. 280/218, 242.1, 280/244, 246, 249

(56) References Cited

U.S. PATENT DOCUMENTS

| | | | | |
|---|---|---|---|---|
| 3,663,038 A | * | 5/1972 | Hendricks | ................... 280/218 |
| 3,902,739 A | * | 9/1975 | Kimura | ...................... 280/249 |
| 5,029,887 A | * | 7/1991 | Grutzner et al. | ....... 280/242.01 |
| 6,220,609 B1 | * | 4/2001 | Jones | ........................ 280/1.13 |
| 6,306,065 B1 | * | 10/2001 | Liang | ........................... 482/51 |
| 6,386,304 B1 | * | 5/2002 | Wang | ......................... 180/65.1 |

* cited by examiner

Primary Examiner—Paul N. Dickson
Assistant Examiner—Faye M. Fleming
(74) Attorney, Agent, or Firm—Raymond Y. Chan; David and Raymond Patent Group

(57) ABSTRACT

A twist vehicle which includes a rear operation system wherein the steering unit of twist vehicle is mounted in a relatively rear position with respect to the vehicle frame, such that a rider can drive the twist vehicle without leaning forwardly and uncomfortably. The function is achieved by connecting the steering unit by a driving member which is further mechanically connected to a driven member by a transmission belt, so that when clockwise and anti-clockwise movements are subsequently imparted to the steering unit, the motions can be transferred to the driven member which are frontwardly apart from the driving member with respect to the vehicle frame by the transmission belt, causing the twisting unit, which is connected to the driven member, to rotate according to the subsequently clockwise and anti-clockwise motions, and therefore causing the twist vehicle to move forwardly.

15 Claims, 4 Drawing Sheets

TWIST VEHICLE WITH REAR OPERATION SYSTEM

BACKGROUND OF THE PRESENT INVENTION

1. Field of Invention

The present invention relates to a twist vehicle, and more particularly to a twist vehicle having a rear operation system, wherein the steering unit of the twist vehicle is mounted in a relatively rear position with respect to vehicle frame of the twist vehicle.

2. Description of Related Arts

As shown in FIG. 1 of the drawings, a conventional twist vehicle comprises a vehicle frame 1, a pair of rear wheels 11 rotatably mounted on two sides of rear portion of vehicle frame 1 to support the twist vehicle, a pivot 13, a twisting unit 14 having two driving wheels space apart from each other and from the pivot 13, and a handle 15 connected to the twisting unit 14. The twisting unit 14 is pivotally connected to the vehicle frame 1 about the pivot 13. To operate the conventional twist vehicle, a rider has to impart clockwise and anti-clockwise movements subsequently to the handle 15, thus to make the twisting unit 14 to rotate and then the pair of driving wheels 12 to turn accordingly about the pivot 13. Amid a series of such turning motions of the driving wheels 12, the twist vehicle moves forwardly.

Since the pair of driving wheels are turned about the pivot 13, so, the longer the perpendicular distance between the pivot 13 and the handle 15, the less the force a rider has to apply to the handle 15 for the same turning moment. However, the longer the perpendicular distance between the pivot 13 and the handle 15, the less comfort the rider should feel as the rider must lean forward to turn the handle 15. Therefore, this kind of conventional twist vehicle is undesirable from the viewpoint of ergonomics.

Thereafter, the conventional twist vehicle is improved as shown in FIG. 2. A more recent twist vehicle comprises a vehicle frame 1, a pair of rear wheels 11 for supporting the vehicle frame 1, a steering unit 15, a transmission unit 150 and a triangular twisting unit 120 having one end portion connected to the transmission unit 150 and remaining two end portions connected to a pair of driving wheels 12 respectively. The transmission unit 150 is rotatably and perpendicularly connected to the vehicle frame 1. When clockwise and anti-clockwise movements are subsequently imparted to the steering unit 15, the transmission unit 150 and therefore the twisting unit 120 turn accordingly as a result, causing the twist vehicle to move forwardly. The steering unit 15 of this kind of more recent twist vehicle extended upwardly and perpendicularly with respect to the vehicle frame 1, rather than frontwardly as shown in FIG. 1, thus preventing a rider from leaning forwardly. However, since the twisting unit 120 is directly connected to the transmission unit 150 which is connected to the steering unit 15, therefore, the more backward the steering unit is positioned with respect to the vehicle frame, the shorter the distance between the axle of the pair of driving wheels 12 and axle of the pair of rear wheels 11, and hence the easier the twist vehicle to flip over.

SUMMARY OF THE PRESENT INVENTION

A main object of the present invention is to provide a twist vehicle which comprises a rear operation system wherein the steering unit of the twist vehicle can be mounted at a relatively backward position such that a rider is able to operate the twist vehicle comfortably, without affecting the axle distance between the pair of driving wheels and the pair of rear wheels of the twist vehicle.

Another object of the present invention is to provide a twist vehicle which comprises a rear operation system wherein the steering unit of the twist vehicle can be mounted inclinedly with respect to the vehicle frame such that a rider is able to operate the twist vehicle comfortably, without affecting the axle distance between the pair of driving wheels and the pair of rear wheels of the twist vehicle.

Another object of the present invention is to provide a twist vehicle which comprises a rear operation system which comprises a driven member which is connected to twisting unit of the twisting vehicle, a driving member which is connected to steering unit of the twist vehicle and is backwardly apart from the driven member with respect to vehicle frame of the twist vehicle, and an endless transmission member, wherein the driven member and the driving member are mechanically connected by the endless transmission member belt, such that any rotating motions of the driving member can be transferred to the driven member by the endless transmission member.

To enable further understanding of the objects and the underlying technological method, the brief description of the drawing below is followed by a detailed description of a preferred embodiment.

DETAILED DESCRIPTION OF THE PREFERRED EMBODIMENT

Figure 1:
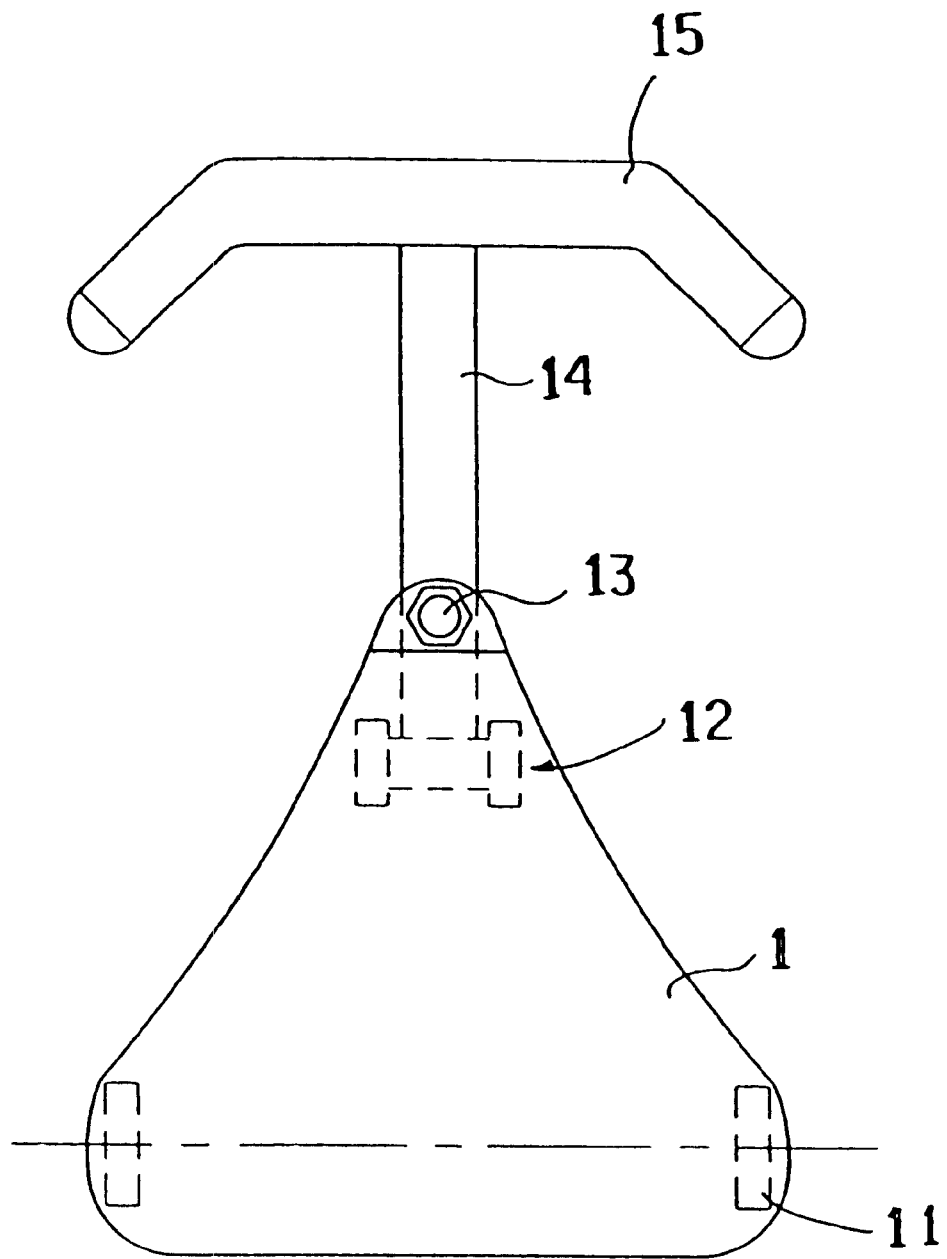
FIG. 1 is a plan view of a conventional twist vehicle.
Figure 2:
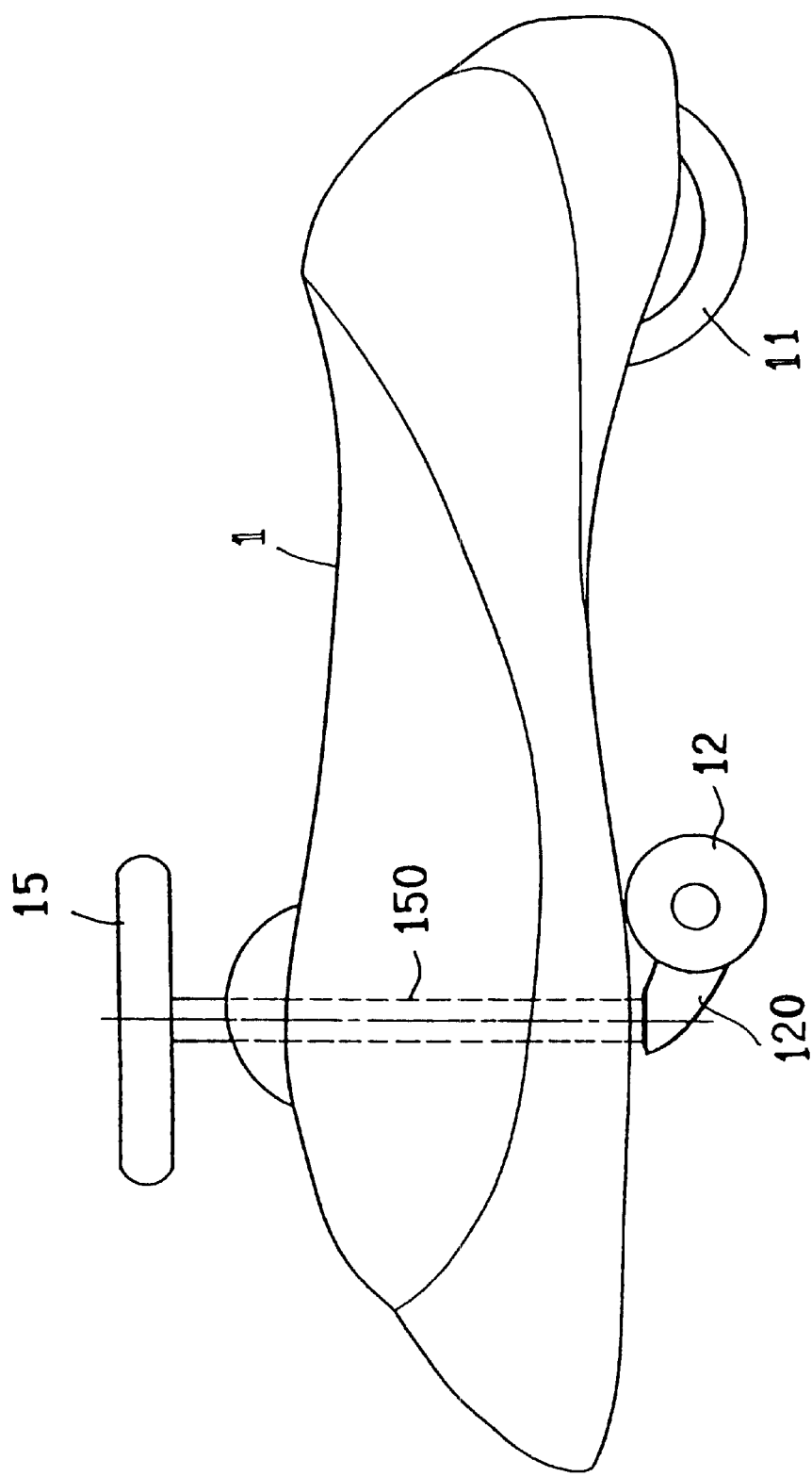
FIG. 2 is a side view of a more recent twist vehicle.
Figure 3:
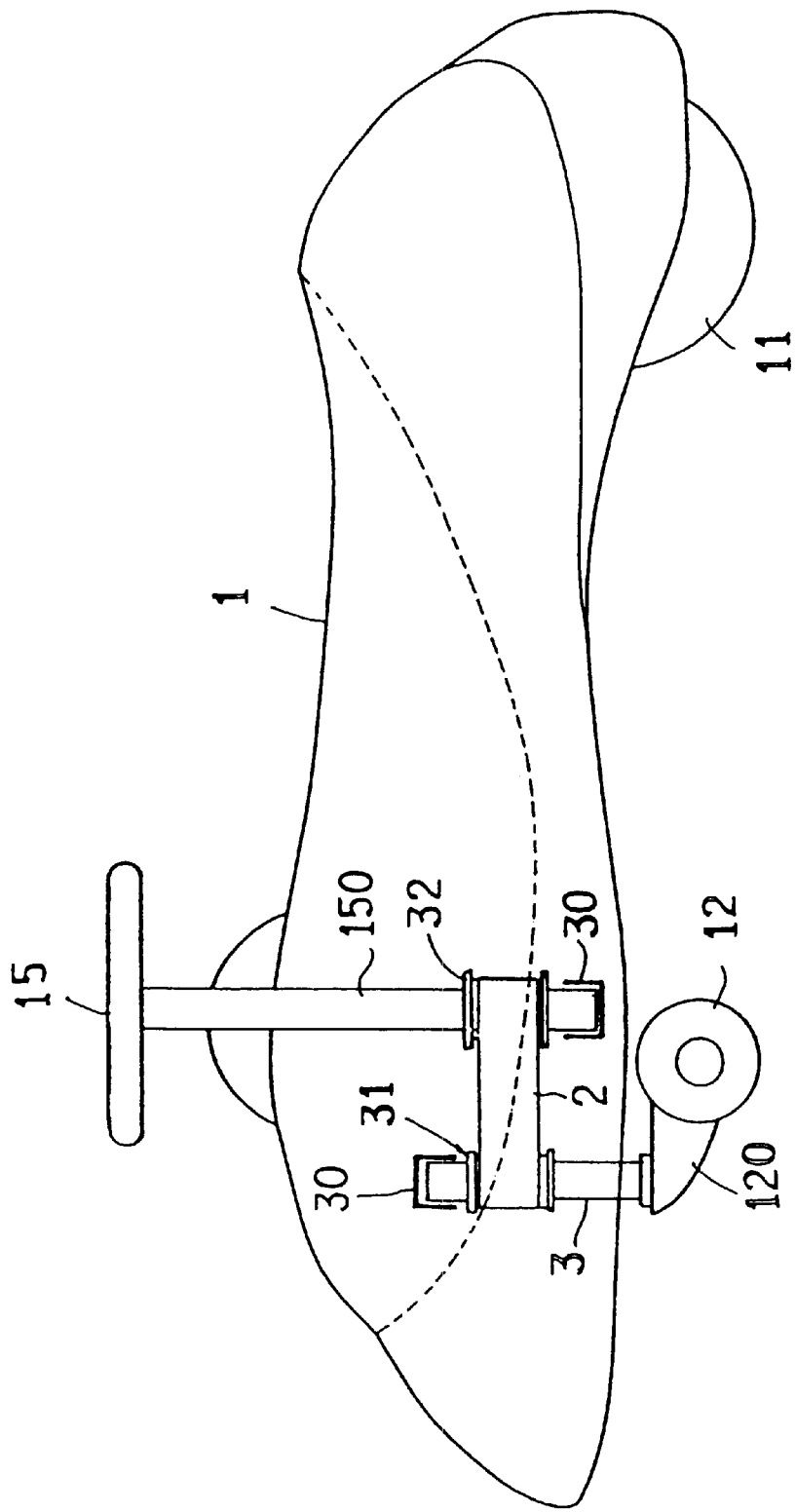
FIG. 3 is a side view of a twist vehicle which comprises a rear operation system, according to a first preferred embodiment of the present invention.

Referring to FIG. 3 of the drawings, a twist vehicle comprising a rear operation system according to a first preferred embodiment of the present invention is illustrated. The twist vehicle comprises a vehicle frame 1, a pair of rear wheels 11 having a same wheel axle for supporting the vehicle frame 1, a twisting unit 120, a pair of driving wheels 12, a steering unit 15 and a rear operation system. The steering unit 15 and the twisting unit 120 are connected to the rear operation system, such that when a clockwise and an anti-clockwise movements are subsequently imparted to the steering unit 15, the rear operation system will transfer the movements to the twisting unit 120, causing the twisting unit 120 to rotate accordingly.

The rear operation system comprises a driven member 3, a driving member 150, a driven belt pulley 31, a driving belt pulley 32, an endless transmission member 2 and two supporting members 30. The driven member 3 is connected to front portion of the twisting unit 120, whereas the driving member 150 is connected to the steering unit 15. The driven member 3 and the driving member 150 are rotatably supported by the vehicle frame 1 in such a manner that they are parallel with each other. The driven belt pulley and the driving belt pulley are coaxially connected to the driven member 3 and the driving member 150 respectively. The driven member 3 and the driving member 150 are mechanically connected by the endless transmission member 2 which is retained in position by the driven belt pulley and the driving belt pulley on the driven member 3 and driving member 150 respectively. The driven member 3 and the driving member 150 are respectively supported by two supporting members 30 attached in the vehicle frame 1.

The twisting unit 120 is basically triangular in shape. One end portion of the twisting unit 120 is connected to the driven member 3 of the rear operation system while the other two end portions are rotatably connected to the pair of coaxial driving wheels respectively.

The endless transmission member 2 comprises a transmission belt which mechanically connects the driven member 3 and the driving member 150. When the driving member rotates, the transmission belt is driven to move and this in turn drives the driven member to rotate. Consequently, the rotational motion of the driving member 150 is transferred to the driven member 3 by the transmission belt.

When clockwise and anti-clockwise movements are subsequently imparted to the steering unit 15, the driving member 3 rotates accordingly and therefore drives the endless transmission member 2 to move. The rotating motions of the driving member 150 are then transferred to the driven member 3 so that the driven member 3 is also rotated according to the rotating motions of steering unit 15. Since the twisting unit 120 is connected to the driven member 3, it is then driven to twist accordingly. Amid a series of the clockwise and anti-clockwise motions, the twist vehicle is driven to move forwardly by the pair of driving wheels 12 connected with the twisting unit 120. As a consequence, a relatively backwardly mounted steering unit is capable of driving the twist vehicle while keeping the axle distance between the pair of driving wheels and the pair of rear wheels unaffected.

Figure 4:
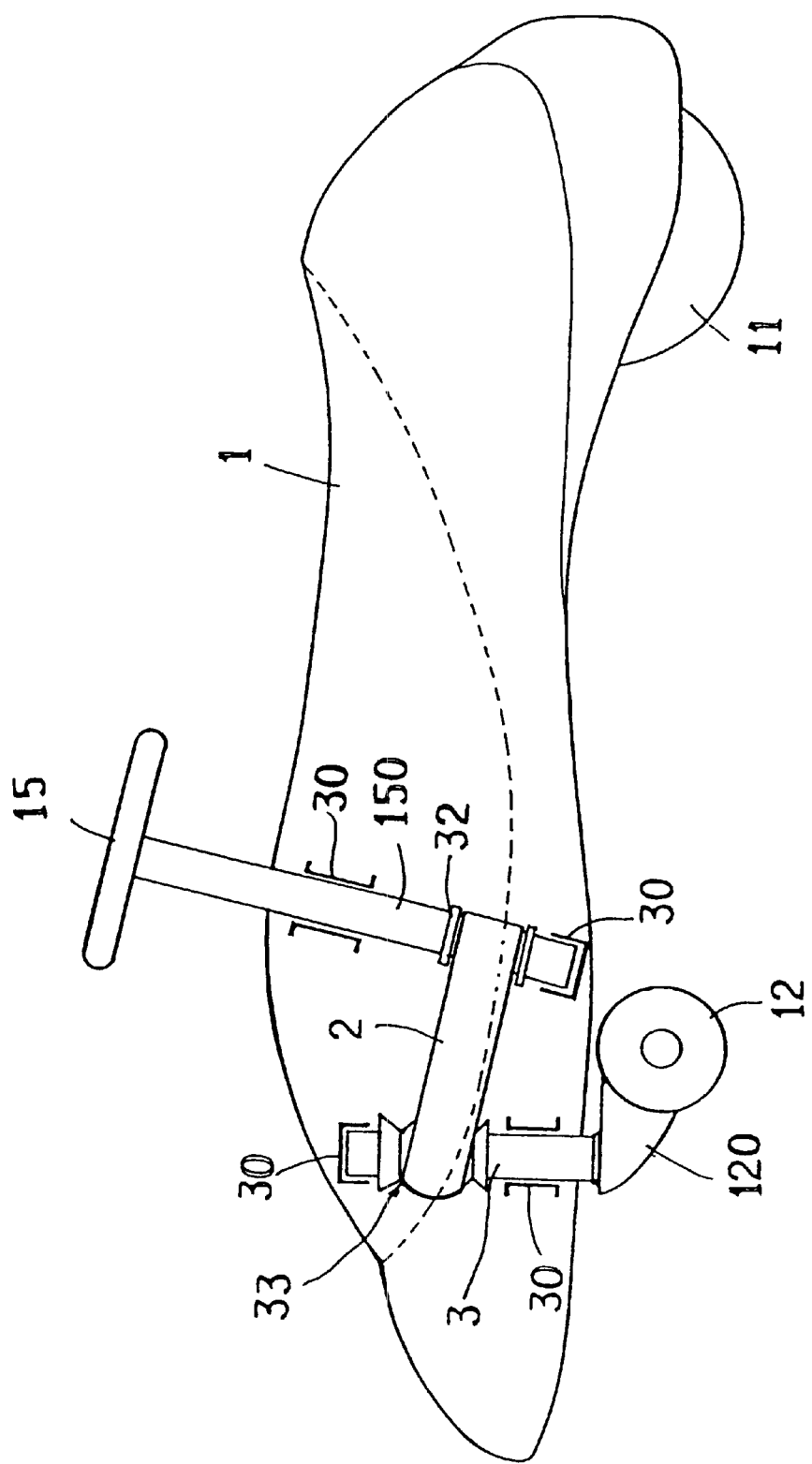
FIG. 4 is a side view of a twist vehicle which comprises a rear operation system, according to a second preferred embodiment of the present invention.

Referring to FIG. 4 of the drawings, a second embodiment of the twist vehicle comprising a rear operation system illustrates a first alternative mode of the above first embodiment of the present invention. According to the second embodiment of the present invention, the driven belt pulley 33, which is coaxially connected with the driven member 3, comprises a pair of tapered wheels to retain the position of the endless transmission member 2. The contacting surface between the endless transmission member 2 and the driven belt pulley 33 is outwardly curved so that the endless transmission member 2 can mechanically connects the driven member 3 and the driving member 150 in such a way that the two members 3, 150 are unparallel with each other without any backlash between the surface of the endless transmission pulley 2 and the outwardly curved surface of the driven belt pulley 33. This arrangement allows the driving member 150 inclines toward a back portion of the vehicle frame 1 while keeping the mechanical transmission intact, and therefore makes the steering unit 15 more desirable from the point of view of ergonomics. The driven member 3 and the driving member 150 each is rotatably supported by two supporting members 30.

When clockwise and anti-clockwise movements are subsequently imparted to the steering unit 15, the driving member 150 rotates accordingly and therefore drives the endless transmission member 2 to move. Due to the tapered nature of the two wheels of the driven belt pulley 33, the inclined endless transmission member 2 is capable of driving the driven belt pulley 33 and therefore the driven member 3 to rotate accordingly. As a result, the twisting unit 120 is driven to twist, causing the twist vehicle to move forwardly.

Note that in either of the above embodiments, when the steering unit 15 and therefore the twisting unit 120 is turned 180° from their normal orientation such that the pair of driving wheels 12 is positioned more forwardly than the driving member 3 with respect to the vehicle frame 1, further subsequent clockwise and anti-clockwise movements imparted to the steering unit 15 will cause the twist vehicle moving backwardly with respect to the vehicle frame 1.

What is claimed is:

1. A twist vehicle, comprising:
   a vehicle frame;
   a rear operation system which comprises:
   a driving member rotatably supported by said vehicle frame;
   a driving belt pulley coaxially connected to said driving member such that when said driving member rotates, said driving belt pulley is driven to rotate accordingly;
   a driven member which is frontwardly apart from said driving member and rotatably supported by said vehicle frame;
   a driven belt pulley coaxially connected to said driven member such that when said driven belt pulley is driven to rotate, said driven member is also driven to rotate by said driven belt pulley; and
   an endless transmission member, which is retained in position by said driven belt pulley and said driving belt pulley, for mechanically connecting said driving member with said driven member, such that when said driving member rotates, said driving belt pulley is arranged to drive said endless transmission member, so as to drive said driven member to rotate accordingly;
   a twisting unit connected to said driven member of said rear operation system, such that when the driven member is driven to rotate, the twisting unit is then driven to rotate accordingly;
   a pair of driving wheels rotatably connected to said twisting unit in such a manner that said pair of wheels spaces apart from each other and said axle of said pair of driving wheels spaces apart from front portion of said twisting unit; and
   a steering unit connected to said driving member of said rear operation system, such that when said steering unit rotates, said driving member is driven to rotate accordingly; such that when clockwise and anticlockwise movements are subsequently imparted to said steering unit, said rear operation system is capable of transferring said clockwise and anti-clockwise movements to said twisting unit, causing said twisting unit to rotate accordingly, and therefore drives said twist vehicle to move forwardly.

2. A twist vehicle, as recited in claim 1, wherein said driven member and said driving member are rotatably and perpendicularly connected to said vehicle frame in such a manner that said driven member and said driving member are parallel with each other.

3. A twist vehicle, as recited in claim 2, wherein said endless transmission member comprises a transmission belt encirclingly connecting said driven member and said driving member, and retained in position by said driving belt pulley and said driven belt pulley respectively so as to prevent said transmission belt moves in up-and-down direction with respect to said driving member, so that a rotational motion of driving member is transferred to said driven member through a movement of said transmission belt.

4. A twist vehicle, as recited in claim 3, wherein said twisting unit is basically triangular in shape having one end portion connected to said driven member of said driven member of said rear operation system and remaining two end portions rotatably connected to said pair of driving wheels.

5. A twist vehicle, as recited in claim 4, wherein said rear operation system further comprises a pair of supporting member supported by said vehicle frame and positioned at end portions of driving member and driven member respectively, for rotatably supporting said driving member and said driven member respectively.

6. A twist vehicle, as recited in claim 5, further comprising a pair of rear wheels rotatably connected to a rear portion of said vehicle frame to support said twist vehicle.

7. A twist vehicle, as recited in claim 1, wherein said endless transmission member comprises a transmission belt encirclingly connecting said driven member and said driving member, and retained in position by said driving belt pulley and said driving belt pulley respectively so as to prevent said transmission belt moves in up-and-down direction with respect to said driving member, so that a rotational motion of driving member is transferred to said driven member through a movement of said transmission belt.

8. A twist vehicle, as recited in claim 7, wherein said twisting unit is basically triangular in shape having one end portion connected to said driven member of said driven member of said rear operation system and remaining two end portions rotatably connected to said pair of driving wheels.

9. A twist vehicle, as recited in claim 8, wherein said rear operation system further comprises a pair of supporting member supported by said vehicle frame and positioned at end portions of driving member and driven member respectively, for rotatably supporting said driving member and said driven member respectively.

10. A twist vehicle, as recited in claim 9, further comprising a pair of rear wheels rotatably connected to a rear portion of said vehicle frame to support said twist vehicle.

11. A twist vehicle, as recited in claim 7, wherein said driven belt pulley comprises a pair of tapered wheels coaxially connected with said driven member for retaining said endless transmission member in position, such that said endless transmission member is capable of transferring a rotational motion of said driving member to said driven member in such a manner that said endless transmission belt is inclinedly supported by said driven member, and wherein said driven belt pulley has an outwardly curved surface which is a contacting surface between said transmission belt and said driven belt pulley, to ensure said driving member is capable of driving said driven member smoothly.

12. A twist vehicle, as recited in claim 11, wherein said twisting unit is basically triangular in shape having one end portion connected to said driven member of said driven member of said rear operation system and remaining two end portions rotatably connected to said pair of driving wheels.

13. A twist vehicle, as recited in claim 12, wherein said rear operation system further comprises two pairs of supporting member, which are supported by said vehicle frame, to support said driving member and said driven member respectively, wherein each of said driving member and said driven member has said one supporting member supporting a end portion and said one supporting member supporting a body portion of each of said driven member and driving member.

14. A twist vehicle, as recited in claim 13, further comprising a pair of rear wheels rotatably connected to a rear portion of said vehicle frame to support said twist vehicle.

15. A twist vehicle, as recited in claim 1, wherein said driving member and said driven member are rotatably connected to said vehicle frame in such a manner that said driving member and said driven member are inclined with each other, with said driving member inclines toward a back portion of said vehicle frame.

* * * * *